US005758584A

United States Patent [19]

Saxton

[11] Patent Number: 5,758,584
[45] Date of Patent: Jun. 2, 1998

[54] RAILROAD CAR WITH LIGHTWEIGHT CENTER BEAM STRUCTURE

[75] Inventor: Gregory J. Saxton, Portland, Oreg.

[73] Assignee: Gunderson, Inc., Portland, Oreg.

[21] Appl. No.: 802,641

[22] Filed: Feb. 19, 1997

Related U.S. Application Data

[63] Continuation-in-part of Ser. No. 655,861, May 31, 1996, Pat. No. 5,626,083.

[51] Int. Cl.$^6$ ................................................. B61D 17/00
[52] U.S. Cl. ........................... 105/355; 105/404; 105/411; 105/416
[58] Field of Search ................................. 105/355, 396, 105/404, 407, 411, 416, 418

[56] References Cited

U.S. PATENT DOCUMENTS

| | | | |
|---|---|---|---|
| 2,839,328 | 6/1958 | Prickett et al. | 296/28 |
| 2,940,402 | 6/1960 | Hansen et al. | 105/367 |
| 2,996,020 | 8/1961 | Udstad | 105/367 |
| 3,159,112 | 12/1964 | Tomlinson | 105/367 |
| 3,230,900 | 1/1966 | Ruprecht et al. | 105/368 |
| 3,244,120 | 4/1966 | Taylor | 105/414 |
| 3,675,592 | 7/1972 | Bateson et al. | 105/368 |
| 3,677,193 | 7/1972 | Pringle | 105/368 |
| 3,690,272 | 9/1972 | Ogle et al. | 105/366 |
| 3,734,031 | 5/1973 | Wagner | 105/367 |
| 4,082,045 | 4/1978 | McNally et al. | 105/411 |
| 4,373,447 | 2/1983 | Pfister | 105/399 |
| 4,543,887 | 10/1985 | Baker | 105/355 |
| 4,681,041 | 7/1987 | Harris et al. | 105/355 |
| 4,753,175 | 6/1988 | Harris et al. | 105/355 |
| 4,784,067 | 11/1988 | Harris et al. | 105/355 |
| 4,802,420 | 2/1989 | Butcher et al. | 105/355 |
| 5,088,417 | 2/1992 | Richmond et al. | 105/411 |
| 5,626,083 | 5/1997 | Saxton | 105/404 |

*Primary Examiner*—S. Joseph Morano
*Attorney, Agent, or Firm*—Chernoff, Vilhauer, McClung & Stenzel

[57] ABSTRACT

A railroad freight car of the center beam type, in which the upright center beam has a top chord interconnected with a bulkhead at each end of the body of the car, and spaced-apart upright columns and diagonal structural members interconnect the top chord with the center sill of the car body. At each end of the center beam an upper end of a diagonal bulkhead brace included in the center beam is attached to the bulkhead at an intermediate height, and a lower end is attached to the center sill adjacent one of the columns. In one version of the car a second diagonal bulkhead brace extends upward to the top chord from a location at an intermediate height on the bulkhead. The car may include inwardly sloping decks oriented normal to load bearing faces of the center beam, with the decks incorporating a unified structure of which a floor sheet is a load-carrying part and is supported by longitudinal stringer channels.

14 Claims, 14 Drawing Sheets

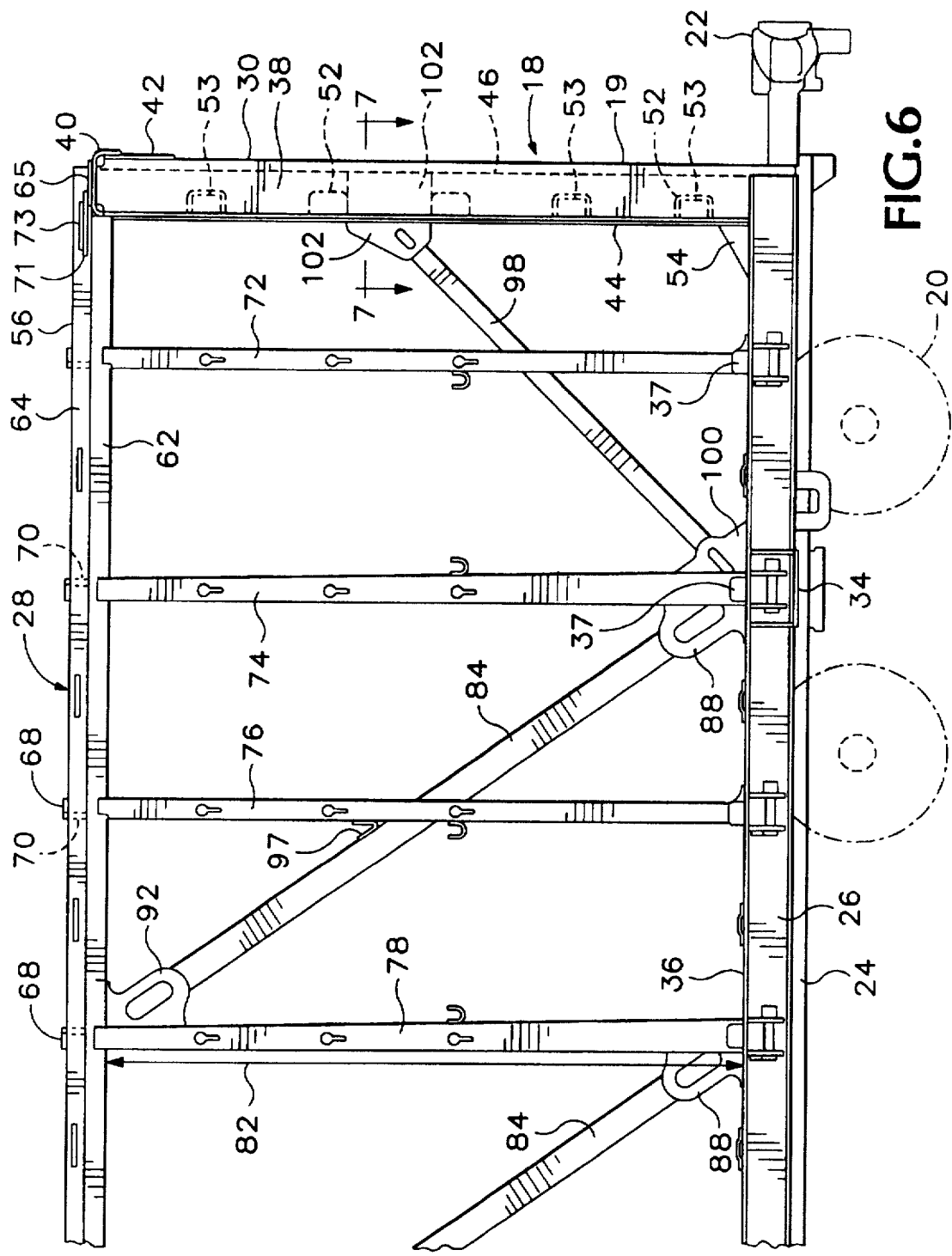

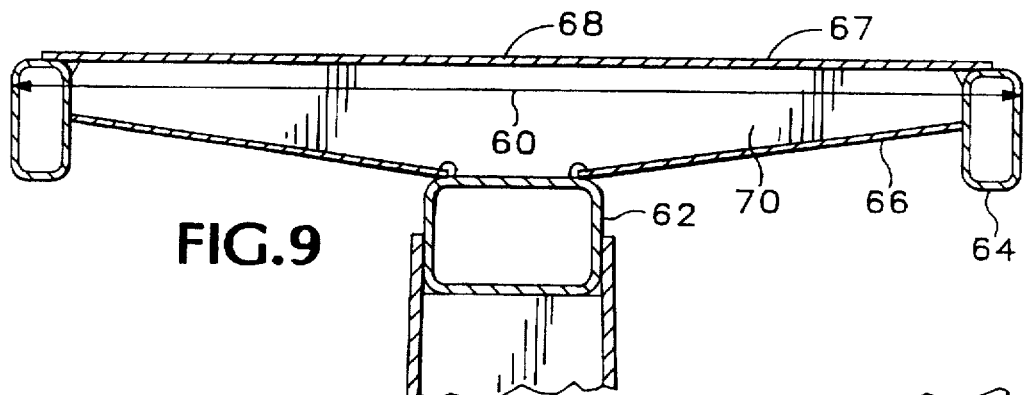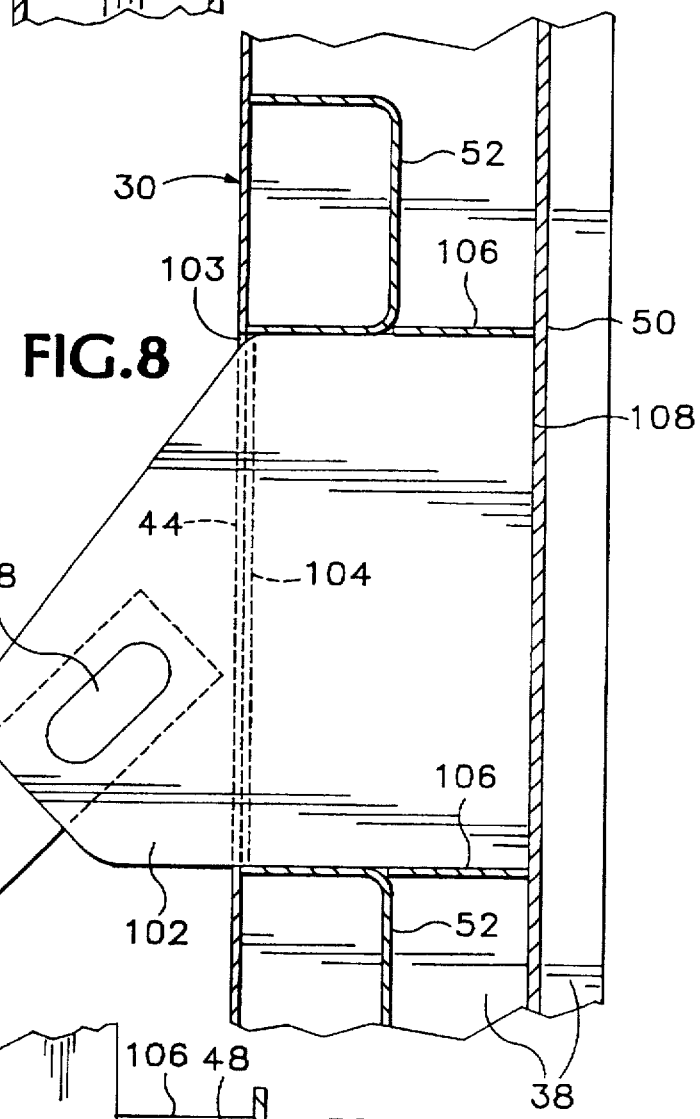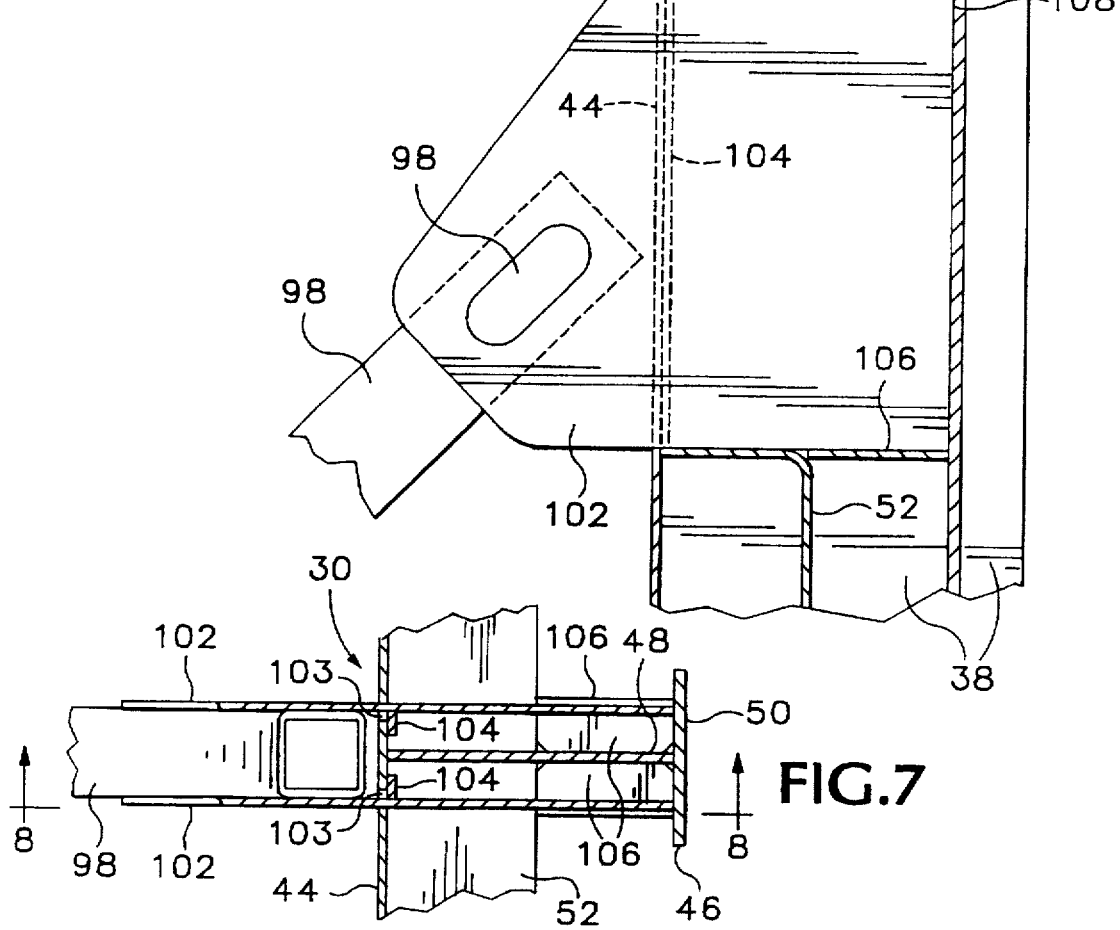

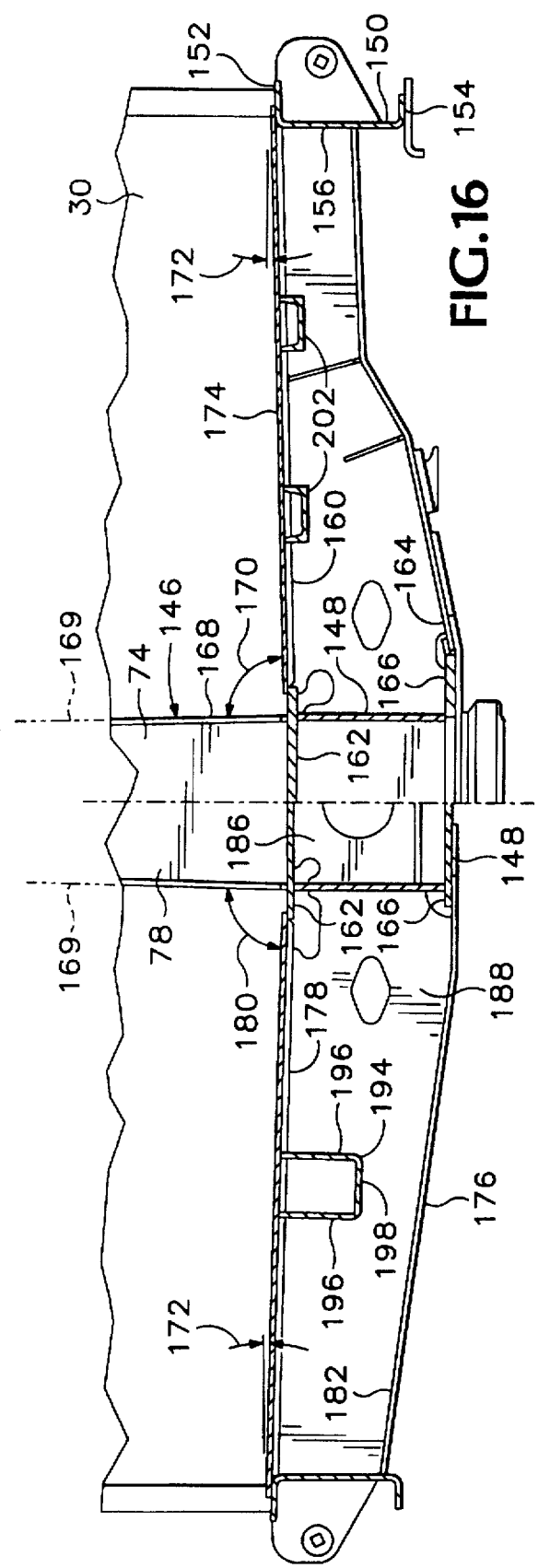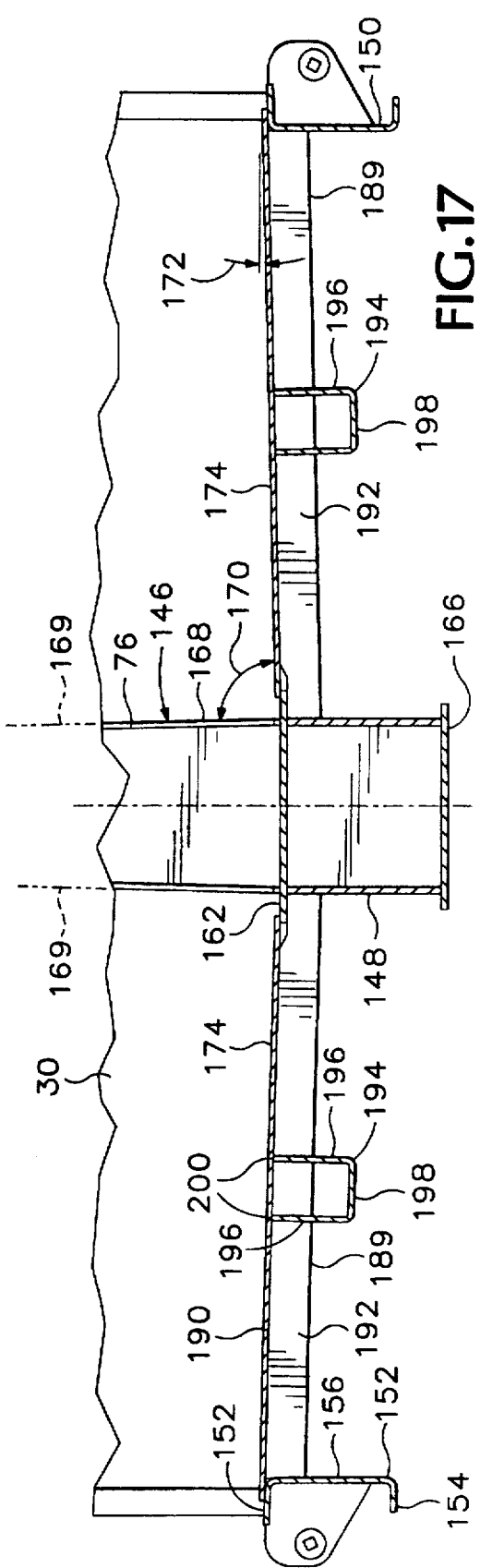

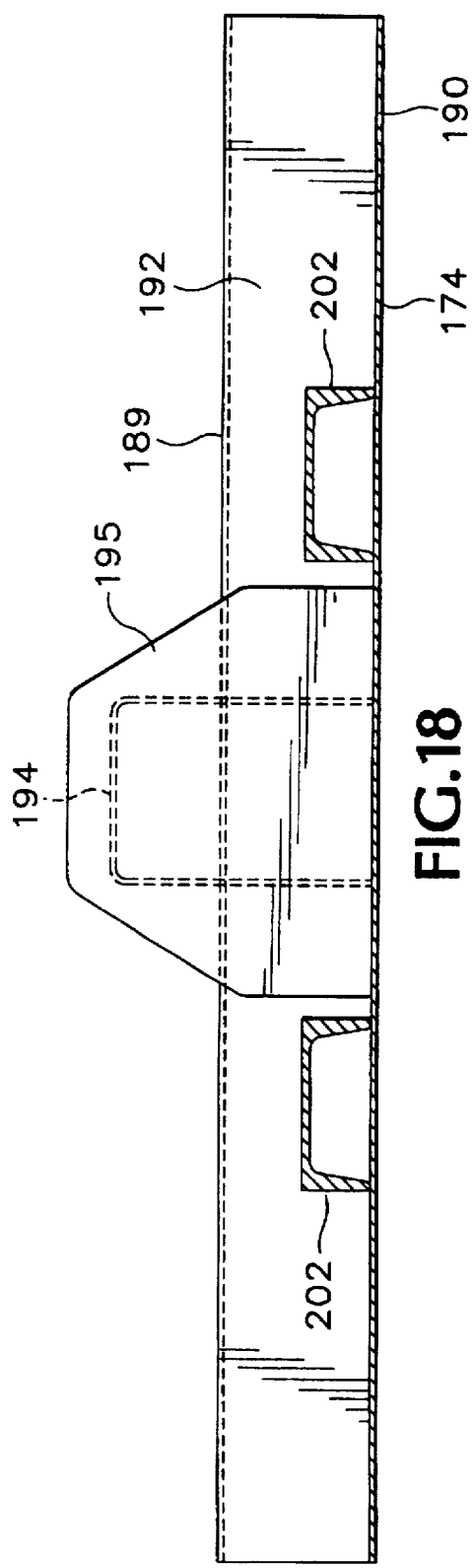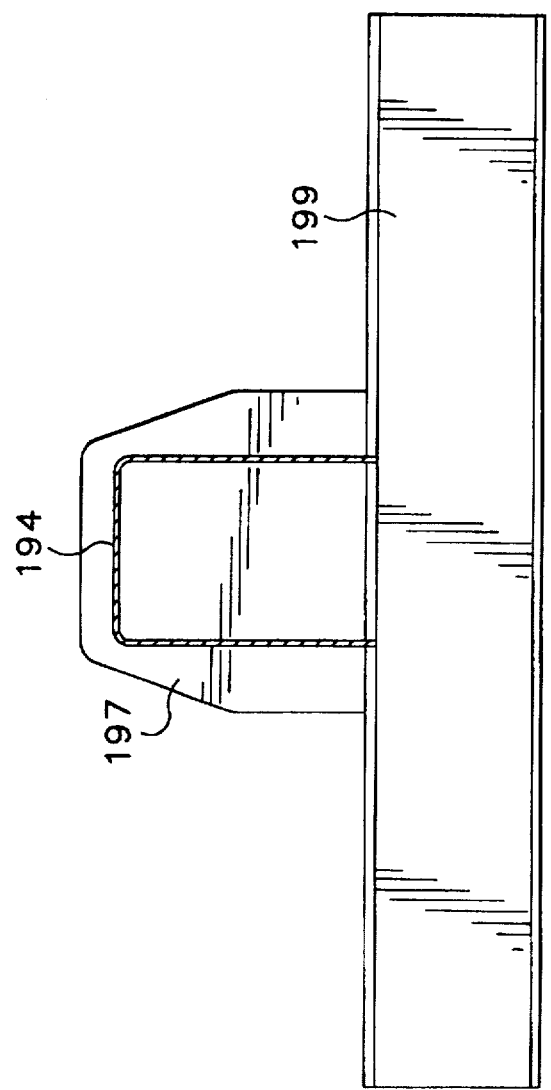

RAILROAD CAR WITH LIGHTWEIGHT CENTER BEAM STRUCTURE

This application is a continuation-in-part of U.S. patent application Ser. No. 08/655,861 filed May 31, 1996, now U.S. Pat. No. 5,626,083.

BACKGROUND OF THE INVENTION

The present invention relates to railroad freight cars and in particular to cars of the type incorporating a tall center beam structure extending along the length of the car body between a pair of bulkheads located at the ends of the car body.

Center beam railroad cars have been used for the past three decades to carry materials such as lumber and sheets of building material which can be contained in packages of uniform size and shape. Such railroad cars have repeatedly been redesigned in attempting to reduce tare weight yet provide ample strength to resist dead weight forces of lading as well as the dynamic forces produced by movement of such a car as a part of a train. Lighter weight in such cars advantageously allows carriage of additional revenue-bearing cargo while the laden car remains within limits on the maximum loading which can be imposed on the rails. Additionally, a lighter car requires less fuel when being moved unladen.

Various stages of development of such center beam cars are represented in prior art patents such as Wagner U.S. Pat. No. 3,734,031, Baker U.S. Pat. No. 4,543,887, Harris et al. U.S. Pat. No. 4,681,041, and Butcher et al. U.S. Pat. No. 4,802,420. The cars disclosed in these patents all include bulkheads at the opposite ends of a car body and an upright longitudinally-oriented center beam including the center sill of the car body, a top chord interconnecting the tops of the bulkheads, and a vertical structure interconnecting the center sill with the top chord along the length of the car body. In such previously known center beam cars a rigid vertical plate is attached to the bulkhead at each end of the car body and extends longitudinally toward the opposite end as part of the center beam. Such a vertical plate extends the entire length of the car in earlier center beam car designs, but in later center beam designs portions of the vertical plate were omitted, as shown in the Baker, Harris et al., and Butcher et al. patents mentioned above. It was still thought to be necessary to provide at least a short vertical plate, immediately adjacent the bulkhead, as shown in Butcher et al., to interconnect the bulkhead with the center beam rigidly and with enough strength to transfer loads from the upper portions of the center beam through the bulkhead to the center sill of the car, even though the weight of such a vertical plate was recognized as imposing a penalty on car lading capacity.

In previous center beam cars transversely oriented, tapered risers have been located atop transverse structural members of a horizontal dock to support loads inclined inward against the tapered center beam structure. Dunnage in the form of individual small pieces of wood has to be placed between bundles during the process of loading such cars, requiring workers to be very close to heavy bundles being loaded onto such cars, with some risk of injury. Horizontal floor sheets have been provided between the risers merely to support people and to protect cargo from road dirt and debris.

What is desired, then, is an improved center beam car of lighter weight than previously has been thought practical, yet which has ample strength to withstand the forces imposed by greater weights of lading than would be carried sanely by previously-known cars Preferably, such a car should also be able to accept loads of irregular length without special measures, and should afford greater safety during loading than previously-known center beam cars.

SUMMARY OF THE INVENTION

The present invention improves upon the prior art by providing a center beam car constructed to have ample strength with a lighter weight than was previously thought possible. A center beam car according to the present invention includes a center sill extending the length of the body, a top chord extending parallel with and upwardly spaced apart from the center sill, upright columns interconnecting the center sill and the top chord, and an elongate diagonal structural bulkhead brace member having one end interconnected with one of the bulkheads at an intermediate height between the center sill and the top chord and another end interconnected with the center sill at a location spaced apart from that bulkhead. According to another aspect of the invention, a center beam car may include a deck whose top floor sheet is sloped inward along each side of the car, preferably oriented so that its upper surface is normal to an imaginary plane including the nearer side of each of the upright tapered columns of the center beam, and in which the floor sheet is an integral load-bearing strength member of the deck.

In one embodiment of the invention the lower end of the diagonal bulkhead brace member is connected with the center sill of the car adjacent one of the columns which extends upwardly above the location of a truck supporting the body of the car.

In another embodiment of the invention a pair of diagonal bulkhead braces extend away from the bulkhead at respective intermediate heights between the top chord and the center sill, with one of those diagonal bulkhead brace members extending diagonally upward to the top chord and the other extending diagonally downward to the center sill of the car body.

In one embodiment of the invention the ends of each diagonal bulkhead brace member are attached to the bulkhead, top chord, or center sill by being welded in place between a respective pair of attachment plates.

The use of diagonal structural members as bulkhead braces interconnecting the bulkhead with the center sill or the top chord creates a structural interconnection of the bulkhead with the center sill and top chord of the center beam which provides the needed strength and rigidity in the car body without the inclusion of the vertical plate whose weight reduced the potential cargo-carrying capacity of prior art center beam cars.

In one embodiment of the invention, the underframe on each side of the center beam includes an outwardly facing channel member located along the laterally outboard margin of the deck and which acts as a side sill of the car. Floor sheets are fastened securely to the center sill, side sills and the transverse structural members of the deck in such an embodiment of the invention. One or more upwardly facing stringer channel members extend longitudinally of the car and are located between the center sill and such side sills of the car. These stringer channels are fastened to the floor sheet, which closes each channel to form box beams, and the channels thus help to support the floor and create an integral deck structure.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 6 is a side elevational view of a portion of the railroad car shown in FIG. 1.

FIG. 7 is a sectional view of a detail of the railroad car shown in FIG. 1, taken along line 7—7 of FIG. 6.

FIG. 8 is a sectional detail view of a portion of the railroad car shown in FIG. 1, taken along line 8—8 in FIG. 7.

FIG. 9 is a sectional view taken along line 9—9 of FIG. 2, at an enlarged scale.

FIG. 16 is a section view taken along line 16—16 in FIG. 14, showing the underframe structure of the car shown in FIGS. 13, 14, and 15.

FIG. 17 is a section view taken along line 17—17 in FIG. 14 showing a transversely extending crosstie that is a part of the underframe structure of the car shown in FIGS. 13–16.

FIG. 18 is a section view taken along line 18—18 of FIG. 15, at an enlarged scale.

FIG. 19 is a section view taken along line 19—19 of FIG. 15, at an enlarged scale.

DETAILED DESCRIPTION OF THE INVENTION

Figure 1:
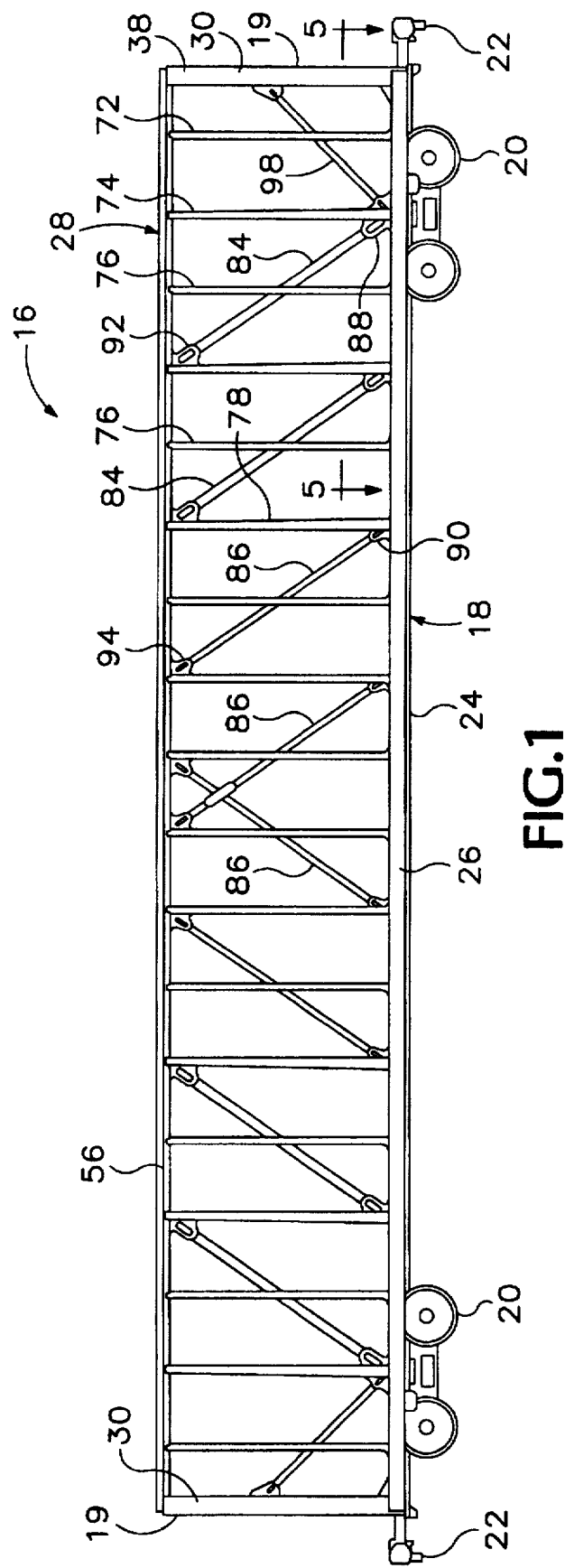
FIG. 1 is a side elevational view of a railroad car including a lightweight center beam structure and embodying the present invention.
Figure 2:
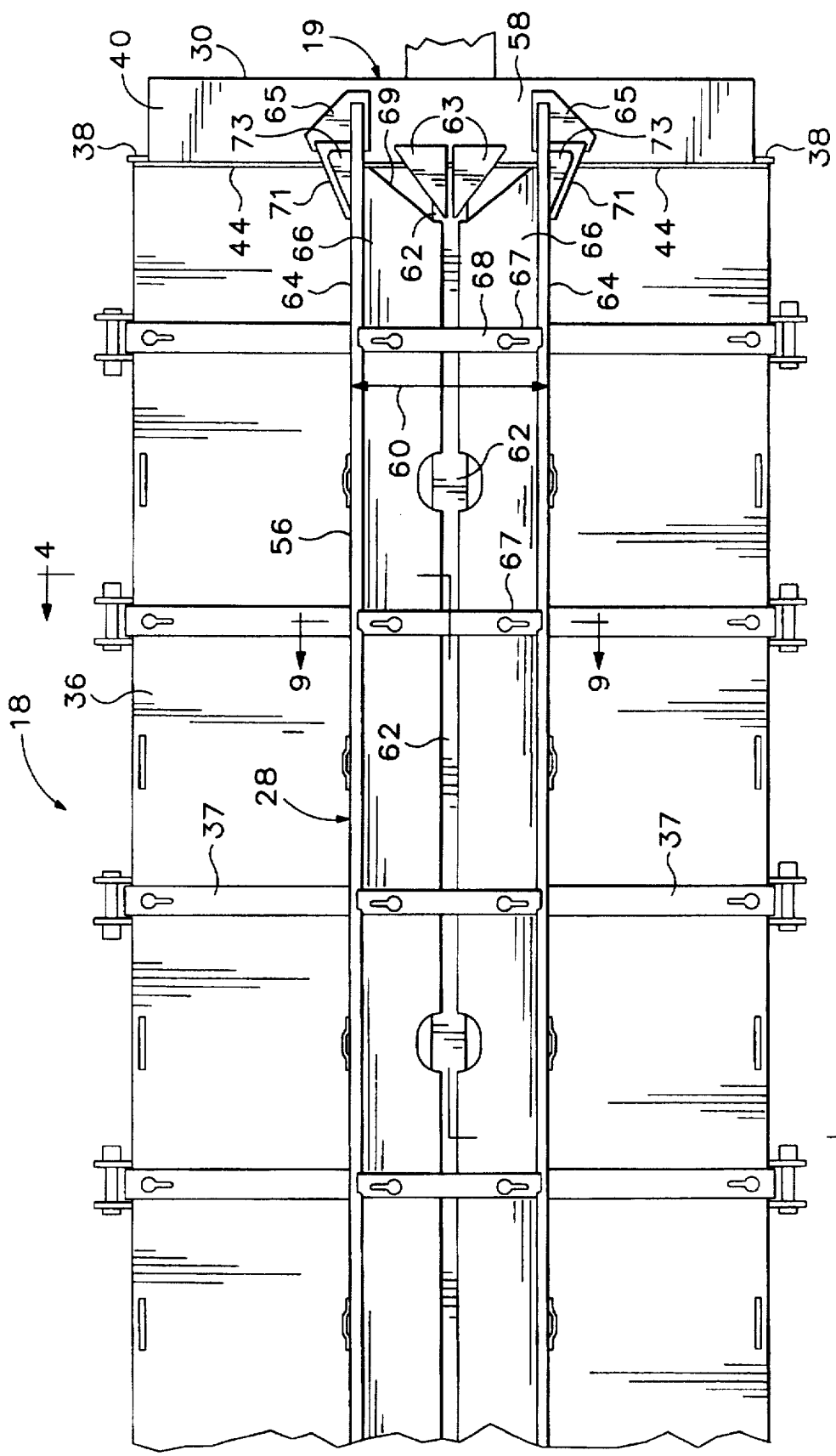
FIG. 2 is a somewhat simplified top plan view of a portion of the railroad car shown in FIG. 1, at an enlarged scale.
Figure 3:
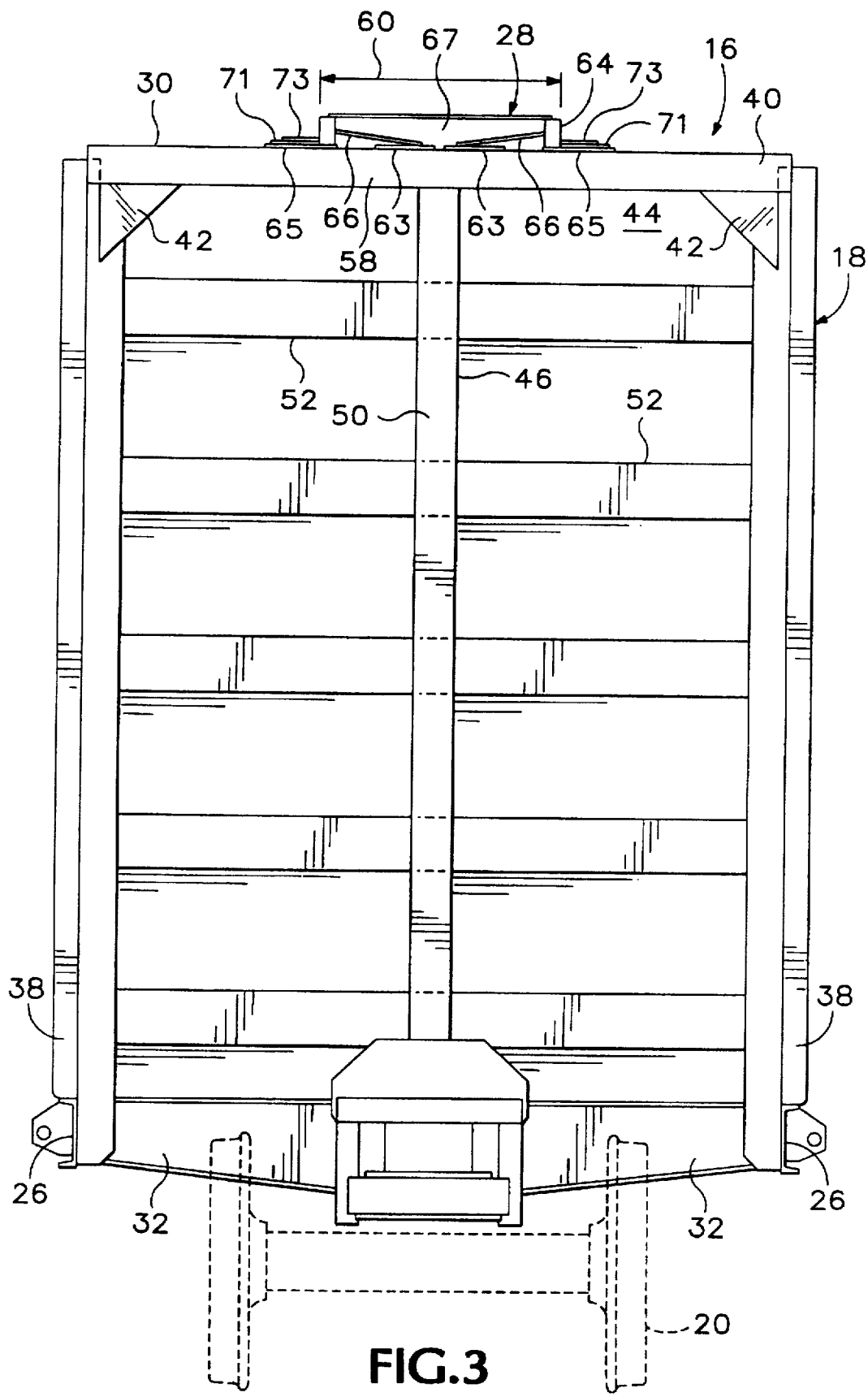
FIG. 3 is a somewhat simplified end elevational view of the railroad car shown in FIG. 1.
Figure 4:
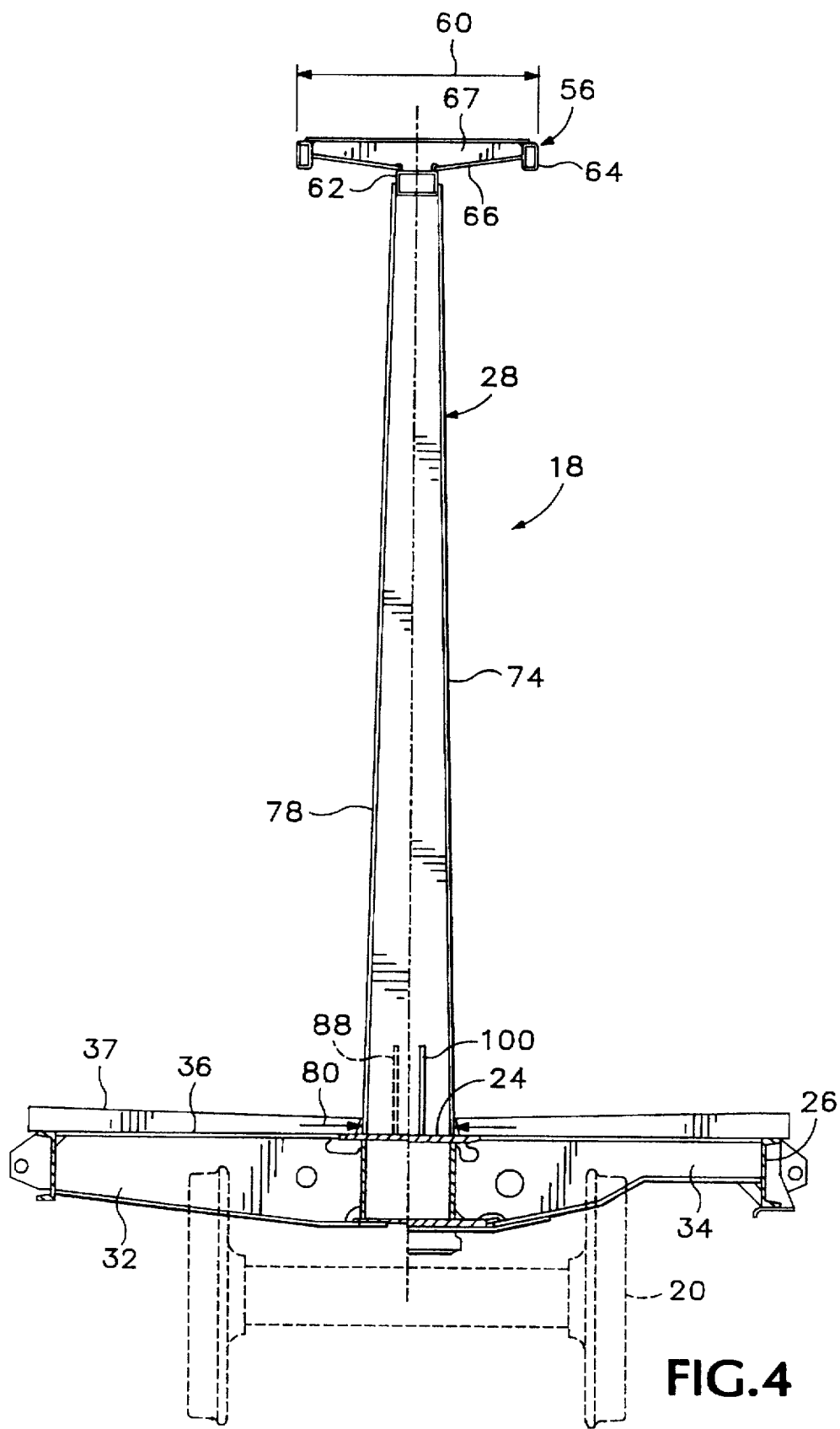
FIG. 4 is a sectional view taken along line 4—4 of FIG. 2, showing the configuration of a body bolster, a central column, and a cross-bearer of the railroad car shown in FIG. 1.

Referring now to the drawings which form part of the disclosure herein, in FIG. 1 a center beam railroad freight car 16 includes a car body 18 having a pair of opposite ends 19. The car body 18 is constructed largely of structural steel tubing and sheet steel and carried on a pair of conventional wheeled trucks 20, and includes a conventional coupler 22 at each end 19. Customary accessories such as ladders, brake hand wheels, and the like ordinarily present on a railroad car are not shown in FIG. 1, for the sake of clarity and simplicity.

The railroad car 16 includes a longitudinally extending center sill 24 and a pair of side sills 26 extending longitudinally of the car body 18 on either side of the center sill 24. A center beam structure 28 extends upward above the center sill 24 and extends longitudinally of the car body 18 between a pair of upright transversely extending bulkheads 30 located at the opposite ends 19.

Referring also to FIGS. 2, 3, 4, and 5, crossbearers 32 extend laterally from the center beam 28 to the side sills 26 on either side of the center sill 24 at regular intervals along the length of the car body 18, except at the location of each of the trucks 20, where a body bolster 34 of more substantial structure extends transversely on either side of the center sill 24 to the respective side sill 26. Atop the cross-bearers 32 and body bolsters 34 is a floor sheet 36 extending the length of the car on each side of the center beam 28, closing the spaces between the center sill and side sills and interconnecting the cross-bearers 32 and body bolsters 34. Risers 37, which are channels of formed steel sheet with tapered flanges, are located atop the floor sheet 36, above and aligned with the crossbearers 32 and body bolsters 34. Additional risers 37 are also located at intervals along the length of the car body 18 in locations where there are no crossbearers 32 nor bolsters 34. These additional risers 37 are supported by flat bar reinforcing members (not shown) attached to the floor sheet 36. The risers 37 each provide a cargo-supporting top surface sloped slightly toward the center beam 28.

The bulkheads 30 at the ends 19 of the car body 18 are both of similar construction including a pair of vertically-extending Z-shaped corner post members 38 of formed plate, each corner post 38 having its bottom end attached to the respective side sill 26. A transverse horizontal top channel member 40 of formed steel extends between and interconnects the tops of the corner posts 38. Gussets 42 provide reinforcement. A face sheet 44 is located on the inner side of the bulkhead 30, facing toward the opposite end 19 of the car body 18. A central vertical stiffener 46 is of "T" shape in section, extending from the center sill to one flange of the horizontal channel member 40, with a web plate 48 forming the stem of the "T" welded to and extending vertically along the outer side of the face sheet 44. A separate chord plate 50 is welded to the plate 48, forming the cap of the "T."

The face sheet 44 is reinforced by horizontal stiffener members 52 such as formed channels arranged with the legs of the channels abutted against the face sheet 44. The reinforcing horizontal channel members 52 extend over the full width of the bulkhead 30 between the corner posts 38, and are spaced vertically apart from one another along the face sheet 44, to which they are welded. Cutouts for the horizontal stiffeners 52 are provided in the web plate 48 of the T-shaped central vertical stiffener 46, and small filler diaphragms 53 of the same thickness as the web plate 48 are welded inside some of the channels 52, in line with the web plate 48, as shown. An upright triangular gusset 54 is located on the center line of the car body, aligned with the stem 48 of the vertical stiffener 46 and extending longitudinally toward the opposite end of the car from a lower portion of each bulkhead 30. The gusset 54 is fastened to the top of the center sill 24 to carry stresses between the base of the bulkhead 30 and the center sill.

At the top of each bulkhead 30 a top chord 56 which is part of the center beam 28 is attached to a laterally central portion 58 of the top of the bulkhead 30. The top chord 56 has a width 60 of 34 inches, for example, and extends for the entire length of the car body 18 to the bulkhead 30 at the opposite end 19. The top chord 56 includes a central member 62, which may be of rectangular steel tube, and a pair of longitudinally extending tubular steel side members 64 interconnected with the central member 62 by sloping sheets 66. Transverse members 67, spaced apart along the length of the top chord 56, are formed of sheet steel and include a horizontal transverse portion 68 welded to each of the side members 64, and a vertical transverse portion 70 welded to each of the side members 64 and to the sloping sheets 66 and the central member 62.

The central member 62 abuts against and is welded to a flange of the horizontal top channel 40. Each of the side members 64 extends above the top channel 40 and is welded to a mounting plate 65 welded, in turn, to the top channel 40. The sloping sheets 66 are cut away, as shown best at 69 in FIG. 2, and a pair of triangular gussets 63 interconnect the top of the central member 62 with the top of the horizontal top channel 40 of the bulkhead 30. Another pair of gussets 71 and doubler gussets 73 connect the two side members 64 to the spacers 65.

Figure 5:
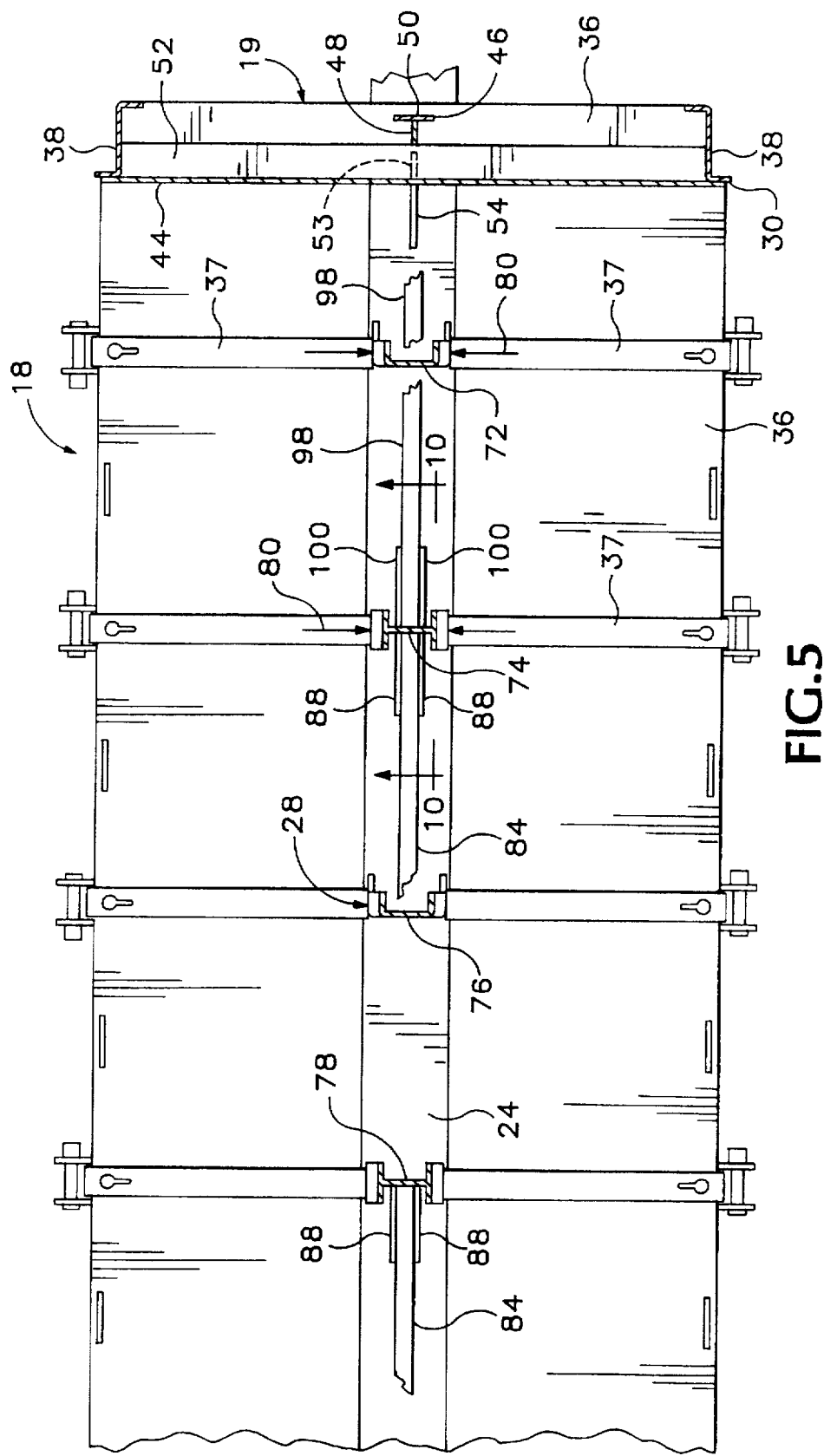
FIG. 5 is a sectional view of a portion of the railroad car shown in FIG. 1, taken along line 5—5.

Interconnecting the center sill 24 with the top chord 56 are several upright center columns including a column 72 of formed sheet, which is closest to the bulkhead 30 at each end 19 of the car. A somewhat larger column 74 is located above each body bolster 34 and may be constructed as a weldment of a transverse plate and a pair of longitudinally extending plates, arranged in the shape of a capital "H" as seen in section (FIG. 5). Several additional small columns 76 are of formed plate construction similar to that of columns 72, and several additional large columns 78 are similar to the columns 74. All of the columns 72, 74, 76, and 78 are tapered from a greatest width 80 at the lower end of each, which is welded to the center sill 24, to a minimum width at the upper end of each, as may be seen in FIG. 4. The upper end of each of the columns 72, 74, 76, and 78 is attached to the central member 62 of the top chord 56, preferably by welding a pair of included flanges of each column to the respective sides of the central member 62. The locations of the cross-bearers 32 and body bolsters 34 coincide with the locations of respective columns 74 and 78 spaced apart longitudinally of the car body 18 at center-to-center distances of, for example, 96 inches while the columns 72 and 76 are spaced apart from the nearest column 74 or 78 by a center-to-center distance of, for example, 48 inches, and are aligned with respective ones of the risers 37. Each of the central columns 72, 74, 76, and 78 may have a height 82 of about 136 inches, for example, to the bottom of the center member 62 of the top chord 56.

Figure 11:
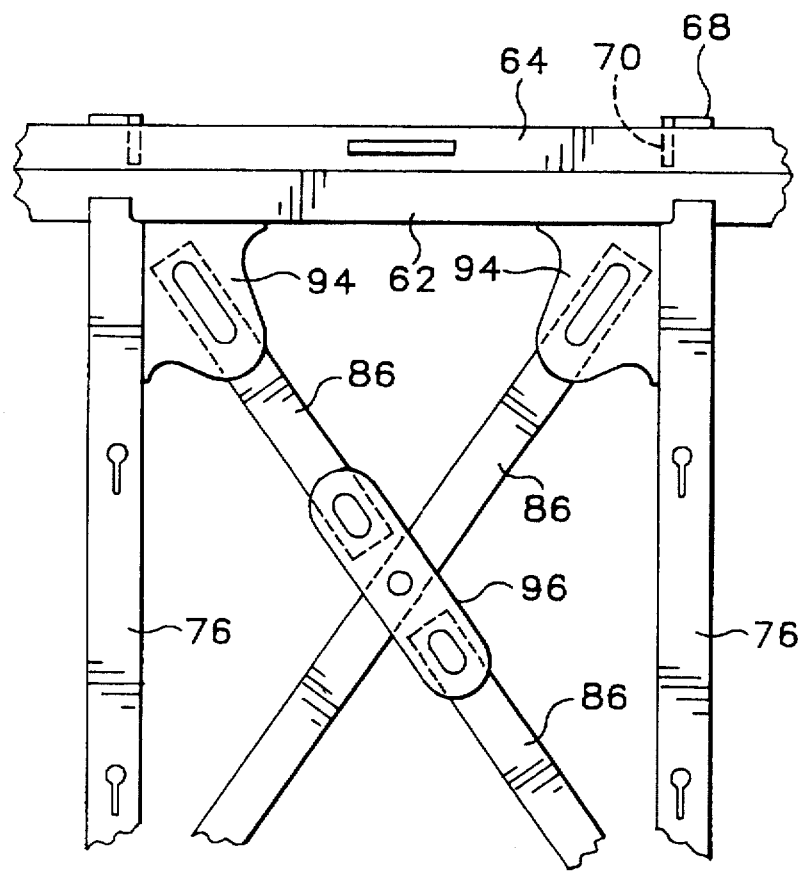
FIG. 11 is a detail view, at an enlarged scale, showing a pair of crossed diagonal members of the center beam structure of the car shown in FIG. 1.
Figure 13:
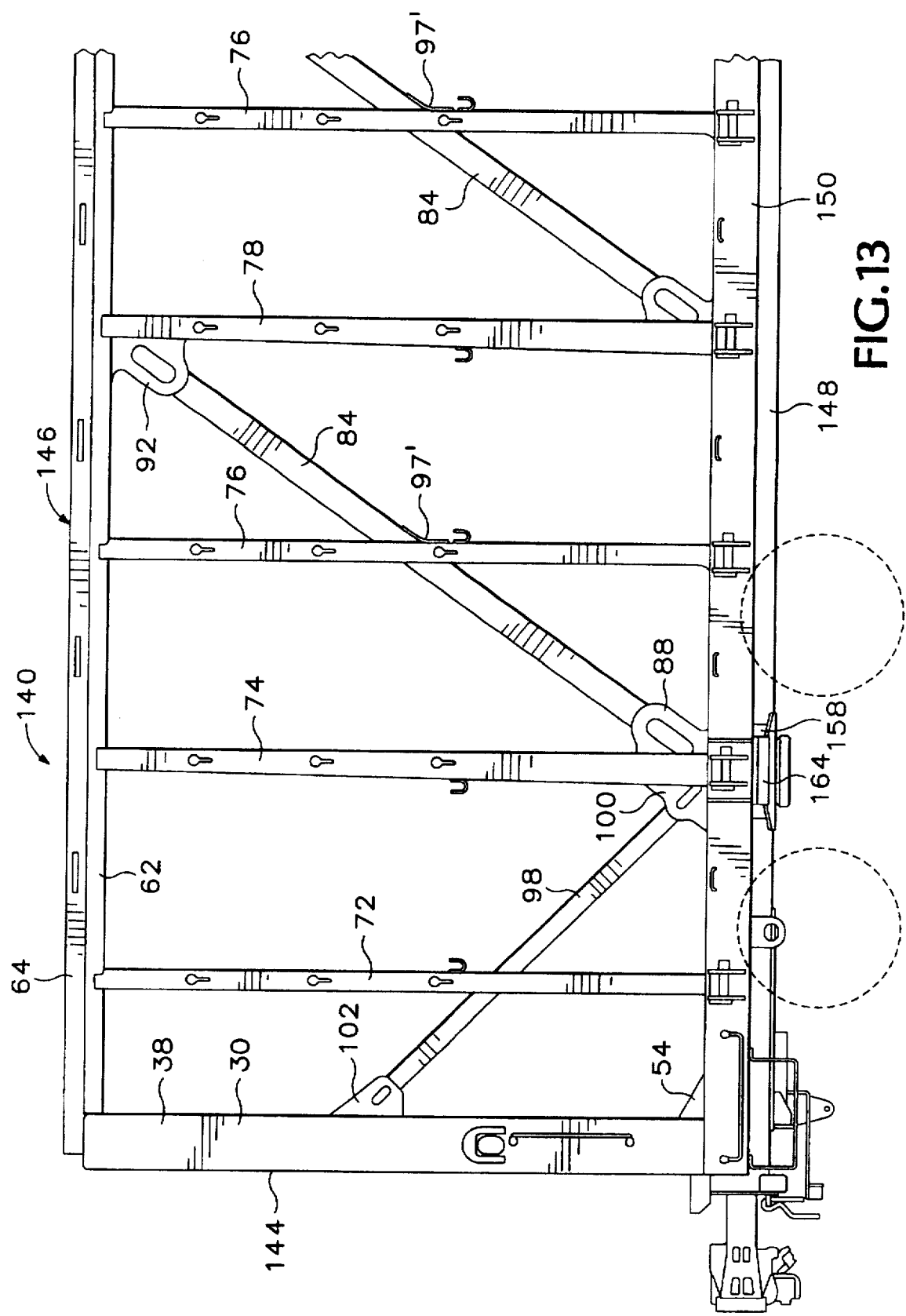
FIG. 13 is a side elevational view of a portion including one end of a railroad car which is a further alternative embodiment of the present invention, shown without a wheeled truck, but with the location of the wheels shown in broken line.
Figure 14:
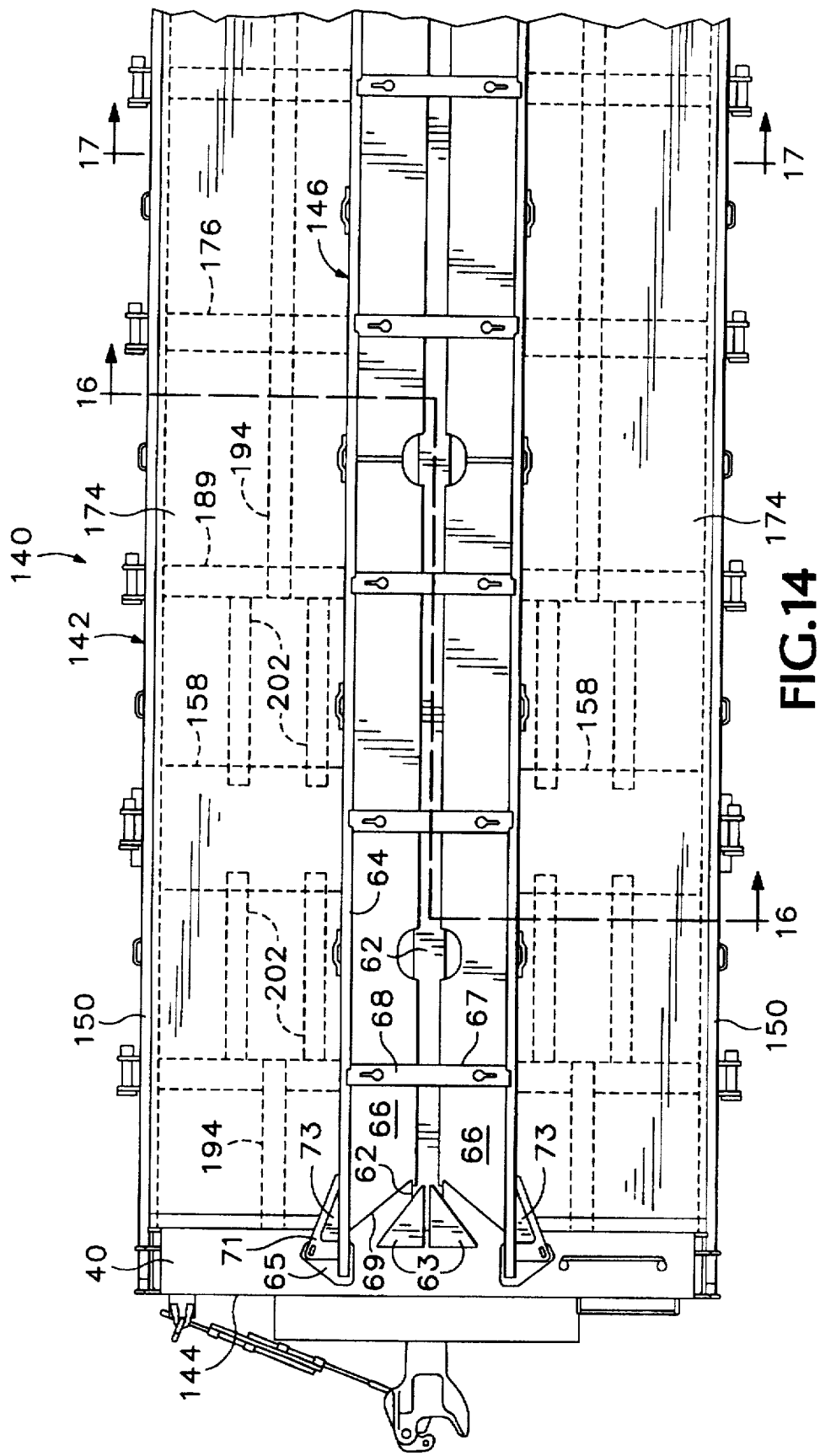
FIG. 14 is a top plan view of the portion of a car shown in FIG. 13.
Figure 15:
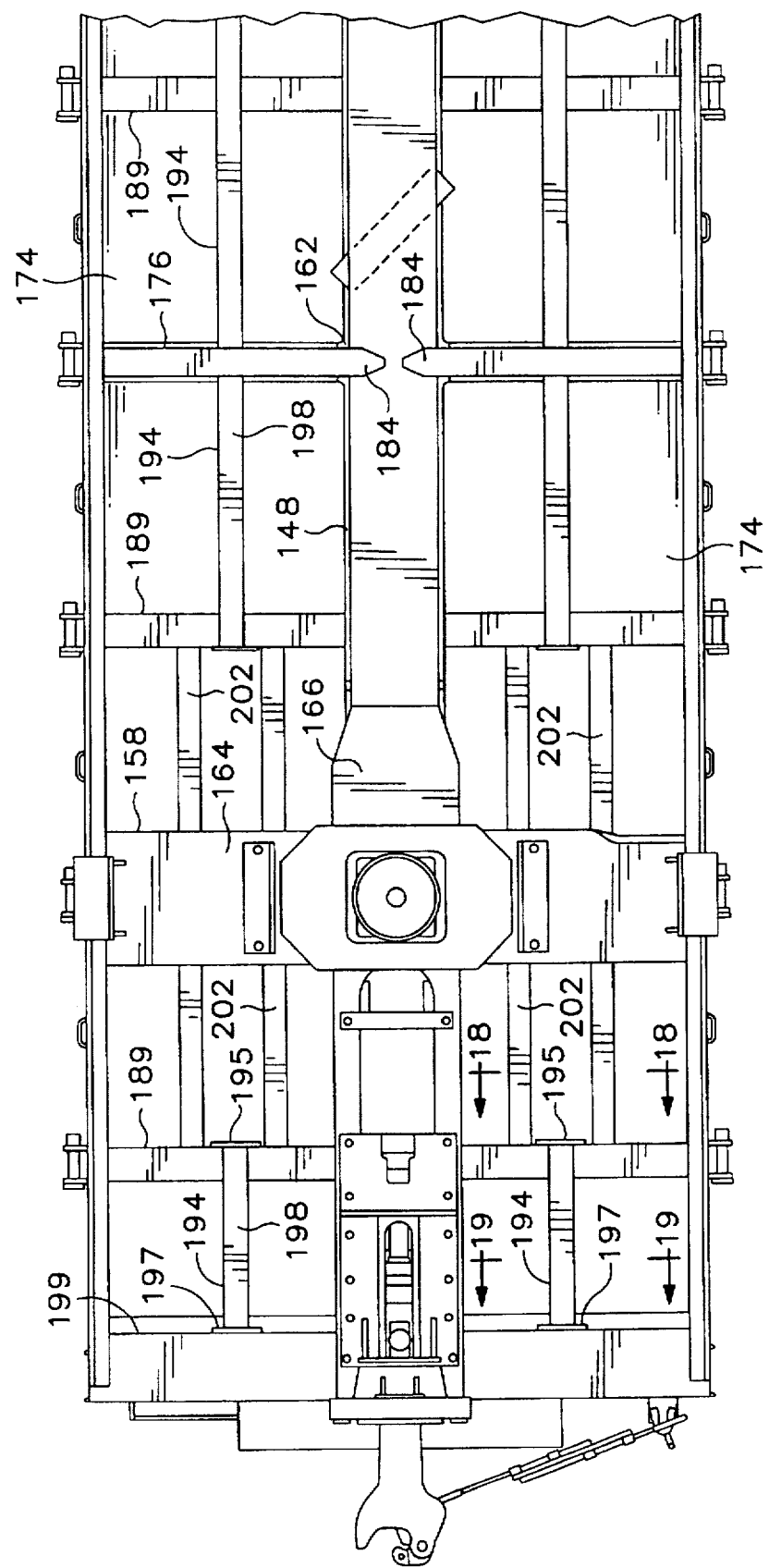
FIG. 15 is a bottom plan view of the portion of a car shown in FIGS. 13 and 14, from which the wheeled truck has been omitted.

Spaced apart longitudinally along the center beam 28 are diagonal structural members 84 and 86 each having a lower end attached to a respective one of the central columns 74 and to the center sill 24 by respective pairs of attachment plates 88, 90, and each having an upper end attached to a respective one of the central columns and to the central member 62 of the top chord 56 by a respective pair of attachment plates 92, 94. The lower end of each of the diagonal members 84 and 86 is closer to the nearer end 19 of the car body than is the upper end. The diagonal members 84 and 86 may be of rectangular tubular steel construction, and the diagonal members 84 are larger than the diagonal members 86, in order to carry the larger forces encountered at their locations. Two of the diagonal members 86 cross each other at the middle of the length of the car body 18, where one of the diagonal members 86 is interrupted, and the two are interconnected by a pair of connector plates 96, shown in greater detail in FIG. 11. A central portion of each of the diagonal members 84 and 86 passes through an aperture defined in a respective one of the columns 76, and a V-shaped strap 97 (or a strap 97' as shown in FIG. 13) has one leg welded to the respective diagonal member 84 or 86 and another leg welded to the respective column 76, to provide a measure of support to the middle of the diagonal member 84 or 86 yet allow some movement relative to the column 76.

Figure 10:
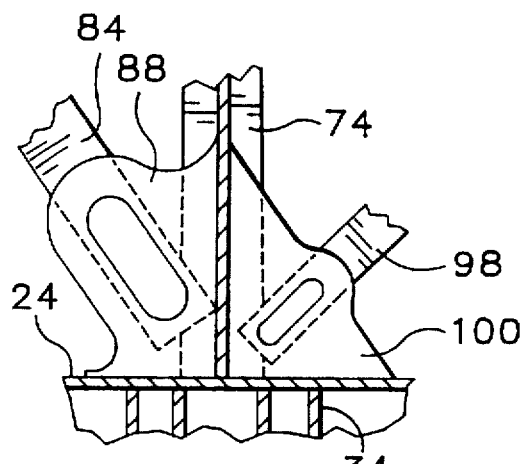
FIG. 10 is a sectional view taken along line 10—10 of FIG. 5, at an enlarged scale.

At each end of the car body 18, extending between the respective bulkhead 30 and the column 74 located above the body bolster 34 located closer to the respective end 19, is a short diagonal bulkhead brace structural member 98 shown best in FIG. 6. A suitable diagonal bulkhead brace member 98 may be of rectangular tubular steel material, for example 4 inches×3 inches in size, with a 5/16-inch wall thickness. As seen best in FIG. 10, a lower end of the diagonal bulkhead brace member 98 is attached to the top of the center sill 24 and to the column 74, in a lower interior corner located in the intersection of the column 74 with the center sill 24, by a pair of attachment plates 100, one of which is welded to each lateral side of the bulkhead brace member 98. The diagonal bulkhead brace member 98 extends diagonally upward, as part of the center beam 28, through an opening defined in the central column 72, the column closest to the bulkhead 30, and its upper end is attached to the bulkhead 30 by being welded between a pair of vertically and longitudinally extending attachment plates 102.

As shown in FIGS. 7 and 8, the attachment plates 102 are welded to the face sheet 44 of the bulkhead 30, extending through slots 103 slightly wider than the thickness of each attachment plate 102, defined in the face sheet 44. A pair of parallel flat backing bars 104 are welded alongside the attachment plates 102 on the opposite, outer, side of the face sheet 44, where they extend vertically and transversely of the car body 18 between the nearest ones of the horizontal channels 52 located upwardly and downwardly adjacent the location of the attachment plates 102. Once the backing bars 104 are in place the excess width of the slots 103 is welded up flush with the face sheet 44. Additional reinforcement plates 106 are oriented horizontally and extend transversely behind the horizontal channels 52. The reinforcement plates 106 are attached to the web plate 48 and chord plate 50 of the T-shaped vertical stiffener 46, securely interconnecting the top and bottom margins of the vertical reinforcement plates 102 with the vertical stiffener 46. An outer vertical margin 108 of each vertical reinforcement plate 102 is also welded to the chord member 50 of the vertical stiffener 46.

The above-described short diagonal bulkhead brace member 98 interconnecting the bulkhead 30 with the center sill 24 and the column 74 of the center beam 28, combined with the previously described attachment of the base of the bulkhead 30 to the center sill 24 and side sills 26, and the interconnection of the top chord 56 to the central portion 58 of the top of the bulkhead 30, result in a center beam 28 which is several hundred pounds lighter than the previously used center beam structure, as a result of not having any solid vertical plate filling the space defined between the bulkhead 30 and the closest center column 72, and between the center sill 24 and the top chord 56 as was used in previous center beam railroad cars.

Figure 12:
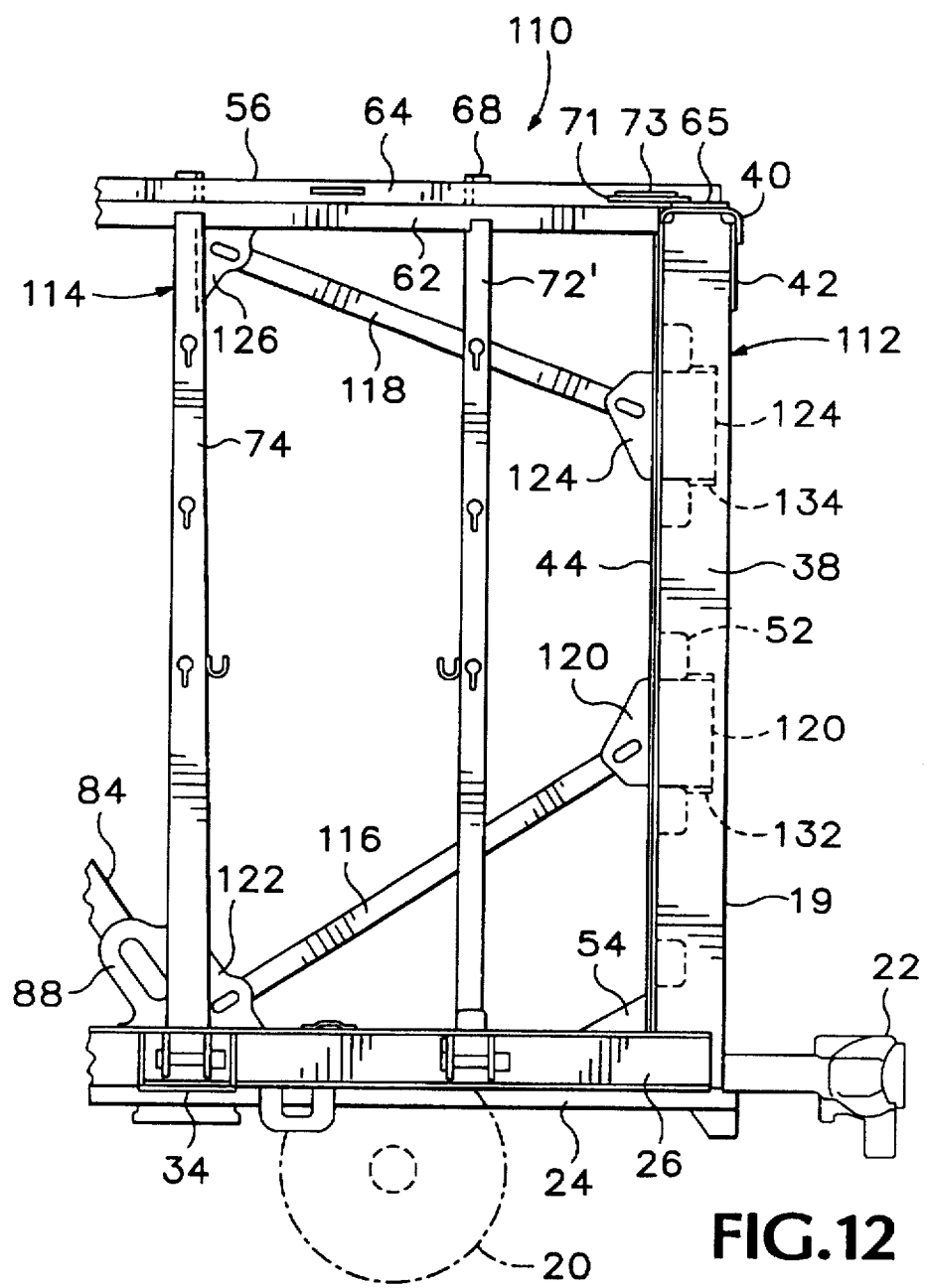
FIG. 12 is a side elevational view of a portion including one end of a railroad car which is an alternative embodiment of the present invention.

A portion of a car body 110 which is another embodiment of the present invention is shown in FIG. 12 in side elevation view. The car body 110 includes at each end 19 a bulkhead 112 which is generally of similar structure to that of the bulkhead 30. The car body 110 includes a center beam 114 similar in most respects to the center beam 28 previously described. The top chord 56 of the center beam 114 is attached to the horizontal top channel 40 of the bulkhead 112 as in the car body 18, and the base of the bulkhead 112 is attached to the center sill 24 and side sills 26 as in the car body 18. The center beam 114 includes a column 72' closest to the bulkhead 112 and a column 74 located above a body bolster 34 which rests atop a truck 20. The principal difference from the car body 18 is that a pair of short diagonal bulkhead brace members 116 and 118 extend from respective intermediate heights along the bulkhead 112 as part of the center beam 114. The lower bulkhead diagonal brace 116 extends from a respective pair of attachment plates 120 on the bulkhead 112 to a pair of attachment plates 122 in the lower interior corner formed by the center sill 24 and the column 74. The upper bulkhead diagonal brace member 118 extends from a respective pair of attachment plates 124 located on the bulkhead 112, spaced above the attachment plates 120 by a distance established by the locations of two of the horizontal stiffeners 52 of the bulkhead 112, to a respective pair of attachment plates 126 in an upper interior corner defined by the top chord 56 and the column 74. Horizontal reinforcement plates 132 and 134 correspond to the reinforcement plates 106 of the bulkhead 30. Each of the diagonal braces 116 and 118 extends through a respective aperture defined in the column 72'.

In a railroad freight car 140 which is another alternative embodiment of the present invention, a car body 142 is generally similar to the car body 18 and includes a pair of opposite ends, of which one end 144 is shown in FIG. 13. As many of the components of the structure of the car 140 are substantially the same as corresponding parts of the railroad car 16 previously described, the same reference numerals are used in FIGS. 13-17 to identify those parts of the car 140, and those parts will not be described again in detail with respect to the car 140.

Thus, at each of the opposite ends of the car 140 is a bulkhead 30, and a center beam 146 extends longitudinally of the car 140 along its vertical center plane between the opposite bulkheads 30. The upper portions of the center beam 146 are similar to those of the center beam 28 described previously. At the base of the center beam 146, however, the structure of the freight car 140 differs from that of the car 16 previously described.

The car 140 includes a center sill 148 corresponding to the center sill 24 and extending longitudinally of the car body 142 along a longitudinal central plane of the car body. Extending parallel with the center sill 148 on each side of the car body 142 are a pair of symmetrically opposite side sills 150 spaced laterally apart from the center sill. As may be seen in FIG. 16, each side sill 150 is fashioned as an outwardly open channel of bent plate having upper and lower flanges 152, 154, respectively, that extend laterally outwardly from a vertical web 156.

Spaced a distance apart from each end 144 of the car body 142 is a body bolster 158 extending transversely between the side sills 150 on each side of the car and interconnecting them with the center sill 148. The body bolster 158 is of conventional stiffened box-beam configuration, with a top flange 160 abutting a top plate 162 of the center sill 148 and a bottom flange 164 abutting a bottom plate 166 of the center sill. A pair of parallel vertical webs 167 extend laterally, spaced several inches apart from each other along the length of the car body. A laterally outer end of the top flange 160 of the body bolster 158 abuts against the side sill 150 and is aligned with the upper flange 152 thereof. The top flange 160 is inclined downward at a small angle 172 below horizontal, extending laterally inwardly from the upper flange 152 toward the top flange 162 of the center sill 148, so that the upper flange 152 and the top flange 160 of the body bolster 158 are substantially perpendicular with the plane 169 of the upwardly-and-inwardly inclined outer face 168 of the corresponding column 74 of the center beam 146, as indicated at 170. As may be seen in FIG. 16, where one half of a body bolster 158 is depicted, laterally outboard portions of the body bolster 158 are of shallower depth than the laterally inboard portions, to provide clearance for the wheels of a truck (not shown) to support the associated end of the car body 142.

A floor sheet 174 of ⅛-inch steel sheet, for example, rests atop the top flange 160 of the body bolster 158 and thus is also inclined laterally inwardly from the side sill 150 toward the center sill 148 and oriented normal to the imaginary plane 169 established by the upwardly-and-inwardly inclined outer face 168 of the column 74 above the body bolster 158 and the coplanar outer faces of the other columns 72, 74, 76 and 78 of the center beam 146.

Located at regular intervals along the length of the car body 142 at locations other than those of the body bolsters 158 are several symmetrically opposite pairs of crossbearers 176 extending transversely of the car body on each side, between the center sill 148 and the side sills 150. The crossbearers 176 are weldments of I-shaped cross section, tapering from a greatest depth adjacent the center sill 148 to a shallower depth at the laterally outboard end of each crossbearer 176, where the depth of the crossbearer 176 is somewhat less than that of the side sill 150.

A top flange 178 of each crossbearer 176 is aligned with the top flange 162 of the center sill 148 and the upper flange 152 of the side sill so that the location of the top flange 178 corresponds with the location of the top flange 160 of each body bolster. The top flange 178 thus is also inclined slightly downwardly toward the center sill 148 and is perpendicular to the plane of the nearer side of the center beam 146, as indicated at 180. The floor sheet 174 also rests atop and is welded to the top flange 178 of each crossbearer 176.

A bottom flange 182 of each crossbearer 176 extends from the web 156 of the side sill 150 toward the center sill 148. An inboard end portion 184 of the bottom flange 182 extends inboard beneath and is welded to the bottom plate 166 of the center sill 148, in order to integrate the structure of the crossbearer 176 with the center sill 148 and the side sill 150. A diaphragm 186 is located within the center sill 148, aligned with the web 188 of the crossbearer 176.

At the locations between crossbearers 176 and body bolsters 158, corresponding to the locations of columns 72 and 76 of the center beam 146, are crossties 189, which also extend between the center sill 148 and the opposite side sill 150, as shown in FIG. 17. Each of the crossties 189 is in the form of an upright U-shaped channel of ⅛-inch sheet steel, for example, with upper margins 190 of the upright side walls 192 of each crosstie 189 being aligned with the top of the center sill 148 and the top of the side sill 150. The upper margins of the crossties 189 are thus parallel with the top flanges 160 and 178 of the body bolsters 158 and crossbearers 176 and similarly are perpendicular to the plane 169 of the nearer face of the center beam 146. The bottom of each crosstie 189 is also parallel with the top flanges 160, 178 of the body bolsters 158 and crossbearers 176. The upper margins 190 are shaped at the inboard end of each crosstie 189 to fit beneath the top flange 162 of the center sill 148, and are welded thereto. The opposite ends of the crossties 189 are welded, respectively, to the center sill 148 and the side sill 150, while the upper margins 190 of the side walls 192 of the crossties 189 are welded to the bottom of the floor sheets 174.

To provide further support and stiffening of the floor sheets 174, stringer channels 194 extend longitudinally of the car body 142, parallel with the center sill 148 and side sills 150 and spaced midway between them, except in the area adjacent to the body bolster 158 at each end 144 of the car body 142. The stringer channels 194 may be of ⅛-inch sheet steel, and each stringer channel 194 preferably has a pair of upwardly extending side walls 196 joined by a horizontal base 198. The upper margins 200 of the side walls are welded along their full lengths to the bottom of the floor sheets 174, which closes the channels to form box beam structures including parts of the floor sheet 174. Each end of each stringer channel 194 is welded to an end plate 195 adjacent a respective crosstie 189 as shown in FIG. 18, or to a slightly different end plate 197 adjacent an end sill 199 at an end 144 of the car body 142, as shown in FIG. 19. Openings are provided in the upper portions of the side walls 196 of the stringer channels to fit closely around the crossties 189, and the margins of such openings are welded to the side walls 192 and base of the crosstie 189 at each intersection of a crosstie 189 with a stringer channel 194.

In the spaces between each body bolster 158 and the adjacent crosstie 189, a pair of shallow stringer channels 202 of rolled channel stock, such as C4×5.4 lb/ft channel, extend parallel with each other, the center sill 148, and side sills 150, and the shallow stringer channels 202, the side sill 150, and the center sill 148 are spaced equidistantly apart from each other. Each of these shallow stringer channels 202 is of similar width but shallower depth than the stringer channels 194, in order to provide ample room for a wheeled truck supporting the car through the respective body bolster 158. One end of each shallow stringer channel 202 is welded securely to a side wall 192 of the respective one of the crossties 189, while the other end is notched and welded to the under side of the top flange 160 of the body bolster 158. The upper margins 204 of the shallow stringer channels 202 are welded along their full length to the bottom of the floor sheet 174, which closes the shallow stringer channels 202, forming box beam structures.

The deck structure of the car body 142 thus includes the center sill 148, the side sills 150, the body bolsters 158, crossbearers 176, crossties 189, stringer channels 194 and 202, and the floor sheet 174, all welded fully together to form a stiff unified, underframe. This structure ham ample strength, even though constructed of lightweight components, to carry the loads imposed on such a center beam car 140 during operation as part of a train. Furthermore, the inwardly-sloping orientation of the floor sheets 174, together with the ample support provided by the crossbearers 176, crossties 189, and stringer channels 194 and 202, makes it unecessary to utilize dunnage beneath prepackaged bundles of cargo. This has the advantage of permitting approximately an additional inch of cargo height to be loaded on a car whose center beam 146 has the same height as that of the center beam car 16, without extending beyond the available space.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:
1. A railroad freight car, comprising:
 (a) an elongate body having upstanding transverse bulkheads located at opposite ends of said body and including a vertical center beam extending longitudinally of the car between said bulkheads, the center beam including
  (i) a center sill, extending the length of said body;
  (ii) a top chord extending parallel with and spaced upwardly apart from the center sill; and
  (iii) at each end of the car, an elongate diagonal structural member having a first end interconnected with one of said bulkheads at an intermediate height between said center sill and said top chord and a second end interconnected with said center sill at a location spaced apart from said one of said bulkheads; and
 (b) said center beam having a pair of opposite sides and said car body including a floor inclined laterally inward toward said center beam and extending along each of said sides thereof.

2. The railroad car of claim 1 including a plurality of upright columns extending from said center sill to said top chord and spaced apart from each other longitudinally of said body, wherein one of said columns, together with said center sill, defines a base interior corner, and said second end of said diagonal structural member is interconnected with both said center sill and said one of said columns adjacent said base interior corner.

3. The railroad car of claim 2 wherein said center beam defines a space between said center sill and said top chord and between one of said bulkheads and a closest one of said upright columns and is free from any vertical longitudinal plate substantially filling said space between said center sill and said top chord and between said one of said bulkheads and said closest one of said upright columns.

4. The railroad car of claim 1, further comprising as a part of said center beam a second elongate diagonal structural member having a first end thereof interconnected with said one of said bulkheads at an intermediate height between said center sill and said top chord, and a second end thereof interconnected with said top chord at a location spaced apart from said one of said bulkheads.

5. The railroad car of claim 4 including a plurality of upright columns extending from the center sill to said top chord and spaced apart from each other longitudinally of said body, wherein one of said columns, together with said top chord, defines an upper interior corner, and wherein said second elongate diagonal structural member is interconnected with both said top chord and said one of said columns adjacent said upper interior corner.

6. The railroad car of claim 1 including a pair of side sills extending longitudinally of said car body, wherein each of said bulkheads includes a plurality of vertically apart-spaced transverse stiffening members and a centrally located upright stiffening member, said elongate diagonal structural member being interconnected with said upright stiffening member through a connecting plate.

7. The railroad car of claim 1, including a pair of trucks spaced apart longitudinally along said car body, each truck being spaced inwardly apart from a respective one of said ends, said center beam including an upright column located above one of said tracks, and said second end of said elongate diagonal structural member being interconnected with said center sill and said upright column above said one of said trucks.

8. The railroad car of claim 1 wherein said center beam is tapered from a greater width adjacent said center sill to a lesser width adjacent said top chord and defines an inwardly inclined load bearing face on each of said opposite sides thereof, and wherein said floor includes a respective floor sheet located adjacent each of said sides of said center beam, each of said floor sheets being oriented substantially normal to said load bearing face of a closer one of said sides of said center beam.

9. A railroad freight car, comprising:
  (a) an elongate body having an upstanding transverse bulkhead located at each of a pair of opposite ends of said body;
  (b) an upright center beam extending longitudinally of the car between the bulkheads, said center beam having a pair of opposite sides; and
  (c) a pair of floor sheets, each inclined laterally inward toward said center beam and extending along a respective one of said sides thereof.

10. The railroad car of claim 9 wherein said center beam is tapered from a greater width adjacent said center sill to a lesser width adjacent said top chord and defines an inwardly inclined load bearing face on each of said opposite sides thereof, and wherein each of said floor sheets is substantially normal to said load bearing face of a closer one of said sides of said center beam.

11. A railroad freight car, comprising:
  (a) an elongate body having an upstanding transverse bulkhead located at each of a pair of opposite ends of said body;
  (b) an upright center beam extending longitudinally of the car between the bulkheads, said center beam having a pair of opposite sides, said center beam including a center sill;
  (c) a pair of side sills spaced apart from said center sill, each said side sill extending longitudinally of said car at a location spaced apart from and parallel with a respective side of said center sill;
  (d) a plurality of crossbearers each extending transversely of said car between said center sill and one of said side sills, each of said crossbearers having a top flange inclined toward said center sill;
  (e) a floor inclined laterally inward toward said center beam along each of said sides thereof and including a floor sheet; and
  (f) a stringer channel attached to said floor sheet, located between said center sill and said one of said side sills and extending longitudinally of said car between adjacent ones of said crossbearers.

12. The railroad car of claim 11 wherein said side sill is a channel having an upper flange extending outwardly in a location substantially aligned with said floor sheet.

13. The railroad car of claim 11 wherein said stringer channel is U-shaped in cross section and has a width and a depth that is greater than said width, said stringer channel including a pair of side walls each having an upper margin attached to said floor sheet.

14. The railroad car of claim 11 wherein said floor sheet extends from said side sill to said center sill and is welded to said center sill, said stringer channel, a respective one of said side sills, and said crossbearer, thereby forming a unified cargo support structure including said floor sheet.

* * * * *

UNITED STATES PATENT AND TRADEMARK OFFICE
CERTIFICATE OF CORRECTION

PATENT NO. : 5,758,584
DATED : June 2, 1998
INVENTOR(S) : Gregory J. Saxton

It is certified that error appears in the above-identified patent and that said Letters Patent is hereby corrected as shown below:

Column 1,
Line 56, delete "dock" and insert -- deck -- in place thereof.

Column 2,
Line 1, delete "would" and insert -- could -- in place thereof.
Line 2, delete "sanely" and insert -- safely -- in place thereof.

Column 6,
Line 18, delete "4 inchesx3inches" and insert -- 4 inches x 3 inches -- in place thereof.

Column 9,
Line 28, delete "C4x5.4 lb/ft" and insert -- C4 x 5.4 lb/ft -- in place thereof.
Line 41, change "length" to read -- lengths --.
Line 48, delete "ham" and insert -- has -- in place thereof.
Line 55, delete "unecessary" and insert -- unnecessary --.

Column 10,
Line 62, delete "tracks" and insert -- trucks -- in place thereof.

Signed and Sealed this

Twenty-seventh Day of November, 2001

Attest:

NICHOLAS P. GODICI
Attesting Officer   Acting Director of the United States Patent and Trademark Office